US010316051B2

(12) United States Patent
Yue et al.

(10) Patent No.: US 10,316,051 B2
(45) Date of Patent: Jun. 11, 2019

(54) STABILIZATION OF LIGNIN FIBERS

(71) Applicant: Tennera, LLC, Knoxville, TN (US)

(72) Inventors: Zhongren Yue, Tullahoma, TN (US); Ahmad D. Vakili, Tullahoma, TN (US)

(73) Assignee: Prisma Renewable Composites, LLC, Knoxville, TN (US)

( * ) Notice: Subject to any disclaimer, the term of this patent is extended or adjusted under 35 U.S.C. 154(b) by 0 days.

(21) Appl. No.: 15/322,780

(22) PCT Filed: Jul. 1, 2015

(86) PCT No.: PCT/US2015/038736
§ 371 (c)(1),
(2) Date: Dec. 29, 2016

(87) PCT Pub. No.: WO2016/004153
PCT Pub. Date: Jan. 7, 2016

(65) Prior Publication Data
US 2017/0137451 A1 May 18, 2017

Related U.S. Application Data

(60) Provisional application No. 62/019,978, filed on Jul. 2, 2014.

(51) Int. Cl.
| C07G 1/00 | (2011.01) |
| C08H 7/00 | (2011.01) |
| D01F 9/17 | (2006.01) |
| D01D 10/02 | (2006.01) |
| D01F 11/02 | (2006.01) |

(52) U.S. Cl.
CPC ............... *C07G 1/00* (2013.01); *C08H 6/00* (2013.01); *D01D 10/02* (2013.01); *D01F 9/17* (2013.01); *D01F 11/02* (2013.01)

(58) Field of Classification Search
CPC .... C07G 1/00; C08H 6/00; D01F 9/17; D01F 11/02; D01D 10/02
See application file for complete search history.

(56) References Cited

U.S. PATENT DOCUMENTS

| 3,529,934 A * | 9/1970 | Shindo | D01F 9/16 264/DIG. 19 |
| 2014/0242867 A1* | 8/2014 | Jansen | C07G 1/00 442/181 |

OTHER PUBLICATIONS

"PoohBear4Ever," (Feb. 2, 2002). Re: simple gassing method [Online discussion group, "Hive Newbee Forum"]. Retrieved from: http://chemistry.mdma.ch/hiveboard/newbee/000265010.html.*
Samuel, et al., Structural characterization of lignin in wild-type versus COMP down-regulated switchgrass, Frontiers in Energy Research 2014; 1: 1-9.*
Material Safety Data Sheet Hydrochloric acid, 37% MSDS, accessed online at http://www.sciencelab.com/msds.php?msdsId=9924286 pp. 1-7, last updated May 21, 2013 (Year: 2013).*

* cited by examiner

*Primary Examiner* — Daniel C. McCracken
(74) *Attorney, Agent, or Firm* — Wood Herron & Evans LLP

(57) ABSTRACT

A process for stabilizing lignin fibers, stabilized lignin fibers made by the process and carbonized fibers made from stabilized lignin fibers. The process includes heating lignin fibers to a temperature ranging from about 100° to about 220° C. while the fibers are in an atmosphere of air and HCl gas, generated as air is bubbled through concentrated hydrochloric acid for a period of time sufficient to stabilize the lignin fibers.

12 Claims, 8 Drawing Sheets

STABILIZATION OF LIGNIN FIBERS

TECHNICAL FIELD

The disclosure is directed to lignin fibers and in particular to methods for stabilizing lignin fibers in order to provide a lignin fibrous product that can be used to make carbon fibers.

BACKGROUND AND SUMMARY

Lignin is a thermo-plastic material that is derived from various biomass materials including hard woods, soft woods and grasses. A thermo-plastic material is a material that when heated to a certain temperature known as the glass transition temperature (Tg) it becomes soft and flowable or extrudable. When the material cools to below the Tg it becomes a solid again. Lignin becomes molten at about 180-200° C. At higher temperatures, lignin decomposes and or reacts with its surrounding environment.

In order to prepare high quality carbon fibers, all of the non-carbon elements in the lignin fibers must be removed from the fibers. Removal of non-carbon elements in the lignin fibers is typically done by heating the fibers to an elevated temperature in an inert gas atmosphere. The foregoing process is called carbonization of the lignin fibers. Prior to carbonization, the lignin fibers are stabilized in a thermal stabilization process. Without stabilization, lignin fibers will soften and possibly form a blob of fused lignin fibers. Hence the thermal stabilization process has to be managed carefully to prevent overheating and or chemical reactions that would damage the fibers. Due to the relatively low glass transition temperature of lignin fibers, the lignin fibers will lose their fiber form if uncontrolled thermal processing is conducted to stabilize the fibers.

Stabilization is a key process to convert lignin fibers to infusible, thermosetting fibers. Thermosetting fibers are fibers that will not soften, as they are reheated or further heated. This normally happens when the precursor polymer (lignin) fibers are oxidation-stabilized in an oxidizing gas (e.g. air) in temperatures of about 300° C. or less, to cause fiber polymers to crosslink. Stabilization of lignin fibers typically starts from a low temperature (usually <Tg) at which an oxidation reaction with the fibers is quite slow. A heating process involving step heating (elevating the fiber temperatures incrementally) is usually used to speed up the stabilization process. Since lignin has a relatively low Tg and melting point, stabilization of lignin fibers is a time consuming process.

During the carbonization of lignin fibers, significantly higher temperatures are used as compared to stabilization temperatures. Accordingly, only stabilized lignin fibers can withstand the significantly higher carbonization temperatures. Without cross-linking or stabilization, the fiber will be degraded during the carbonization thermal processing. The lignin fiber diameter, as spun, is engineered to be very close to the final carbon fiber diameter that is to be produced for specific applications. Even though a certain amount of shrinkage in length and diameter is expected during the stabilization and carbonization process, there are ways to maintain or to control the final fiber diameter. For example, by application of tension during the various thermal processing steps.

During the fiber spinning process of a lignin precursor, the macromolecular chains, to a certain extent, become aligned in the fiber spinning direction (along the fiber axis). However, during the thermal processing (especially when the temperature is higher than the glass transition temperature (Tg) of the lignin fibers), macromolecular chains tend to become free. It is believed that the stabilization process eliminates —OH groups from the fibers. Elimination of —OH groups and reactions in inter- and intra-molecules and subsequent aromatic reactions result in fiber shrinkages. To produce high performance resulting carbon fibers, high orientation of carbon structures (from the lignin molecules) in fiber is sought. Thus, reasonably limiting the fiber shrinkage during thermal processing is desirable.

Carbon Yield (wt %) is another important factor which can affect the cost of carbon fibers. Carbon yield is defined as the ratio of the weight of carbon fibers to the weight of spun lignin fibers. Higher carbon yield is always expected and preferred in carbon fiber manufacturing, as this is an indication of more efficient conversion processing of a given precursor material.

Accordingly, what is needed is a process that can be used to stabilize lignin fibers quickly and obtain higher carbon yield without adversely affecting the length, diameter, and/or strength of the resulting stabilized fibers and carbon fibers.

In one embodiment, the disclosure provides a process for stabilizing lignin fibers comprising heating lignin fibers to a temperature ranging from about 100° to about 220° C. while contacting the fibers with an atmosphere of air bubbled through concentrated hydrochloric acid for a period of time sufficient to stabilize the lignin fibers.

In another embodiment, the disclosure provides stabilized lignin fibers comprised of lignin fibers heated to a temperature ranging from about 100° to about 220° C. while contacting the fibers with an atmosphere of air bubbled through concentrated hydrochloric acid for a period of time sufficient to stabilize the lignin fibers.

In another embodiment, the disclosure provides carbon fibers made by carbonizing stabilized lignin fibers, wherein the stabilized lignin fibers are made by heating the fibers to a temperature ranging from about 100° to about 220° C. while contacting the fibers with an atmosphere of air bubbled through concentrated hydrochloric acid for a period of time sufficient to stabilize the lignin fibers.

Advantages of the disclosed embodiments provide a method for stabilizing lignin fibers in a relatively short period of time while maintaining the diameter and length and increasing the strength of the fibers. The relatively short period of time for fiber stabilization greatly enhances the process of carbonization of the fibers. Compared to conventional lignin fiber stabilization processes, which may take many hours and/or many days, the disclosed embodiments enable fiber stabilization in less than two hours.

Advantages of the disclosed embodiments also provide a method for obtaining higher carbon yield of the resulting carbon fibers while maintaining the diameter and length and the strength of the fibers. Reducing the time for fiber stabilization greatly enhances economics of the process of stabilization and carbonization of the fibers. Compared to conventional lignin fiber stabilization processes, which may result in a carbon yield of about 31.5% for the carbon fiber, the disclosed embodiments enable carbon yield higher than about 40%.

Other features and advantages of the disclosed embodiments may be evident from the following detailed description of exemplary embodiments.

DETAILED DESCRIPTION OF EXEMPLARY EMBODIMENTS

Figure 1:
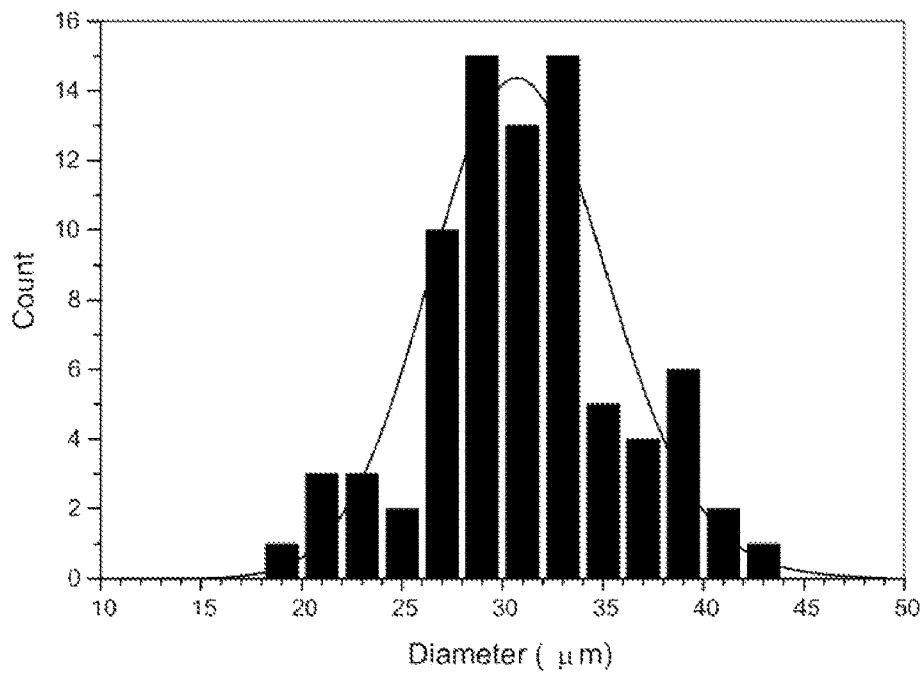
FIG. 1 is a graph of diameter distribution of green fiber #171.

In order to conduct the stabilization process according to the disclosure, the lignin fibers are exposed to an acidic gaseous atmosphere containing hydrochloric acid (HCl) during thermal stabilization. Gaseous HCl can be obtained from various sources including commercially available pure, dry HCl gas. For purposes of the tests described below, the HCl gas was generated by bubbling air at room temperature (a temperature ranging from about 20 to about 40° C.) through a concentrated solution of HCl in water (about 37 wt. % HCl in water). The stabilized lignin fibers are made by heating the fibers to a temperature ranging from about 100° to about 220° C. while contacting the fibers with an atmosphere of the acidic gas comprised of air bubbled through concentrated hydrochloric acid for a period of time sufficient to stabilize the lignin fibers. The HCl is believed to help remove the —OH groups in lignin fiber (polymer) and further promote the crosslinking of lignin fiber at lower temperatures within significantly shorter time.

Without desiring to be bound by theoretical considerations, it is believed that HCl is effective where —OH groups are present in the lignin fibers. Accordingly, it is believed that HCl facilitates chemical reactions that help to increase the melting point of the lignin fibers to provide improved thermal behavior. As the Tg or softening point of the lignin fibers increase, higher temperatures may be used with shorter heating times without softening the fibers. Hence, the overall time needed to stabilize the fibers is significantly reduced.

The following non-limited procedures and examples are provided to further illustrate features and advantages of the disclosed embodiments.

Materials and Processes

Three different green (lignin) fiber samples and one "conventionally" stabilized fiber sample were obtained as listed in Table 1. Conventionally stabilized fibers are defined as those which are processed in an oven (or multiple ovens) containing a standard atmosphere (primarily nitrogen and oxygen) at temperatures up to approximately 250° C. Stabilization traditionally occurs at rates between 0.1° C./minute to 0.05° C./minute.

TABLE 1

Green Fiber Samples

| | Fiber | | | |
|---|---|---|---|---|
| | Green Fiber | | | Conventional Stabilized fiber |
| ID Code | #171 | #172 | T021 | unknown |
| Source | Switchgrass | Poplar | Poplar | unknown |

Green (lignin) fibers were placed in a tube furnace, without applying any restraining or tension (released), and stabilized by contacting the lignin fibers with air that was bubbled through concentrated HCl to produce stabilized fibers. The stabilized fibers were carbonized at 1000° C. in a nitrogen atmosphere. The parameters used in stabilization and carbonization processes are listed in Table 2.

TABLE 2

Parameters used in stabilization and carbonization processes of spun lignin fibers

| | Stabilization in HCl with air | | |
|---|---|---|---|
| Fiber | Temperature (° C.) | Time (min) | Carbonization |
| #171 green | 113-210 | 110 | 1000° C. in $N_2$ |
| #172 green | 116-210 | 110 | |
| T021 green | 120-210 | 100, 75, or 35 | |
| Conventional stabilized fiber | (heating rate: 0.1 to 0.05° C./min; Max. temperature: 250° C.) | | |

Lignin fibers, prepared stabilized fibers, and carbon fibers were characterized based on fiber diameter and tensile properties. Carbon fibers are produced from lignin precursor (lignin fibers). Therefore, the lignin fibers' diameter and their variations as well as the tensile strength of the fibers all strongly affect the final structure and properties of resulting carbon fibers.

Figure 2:
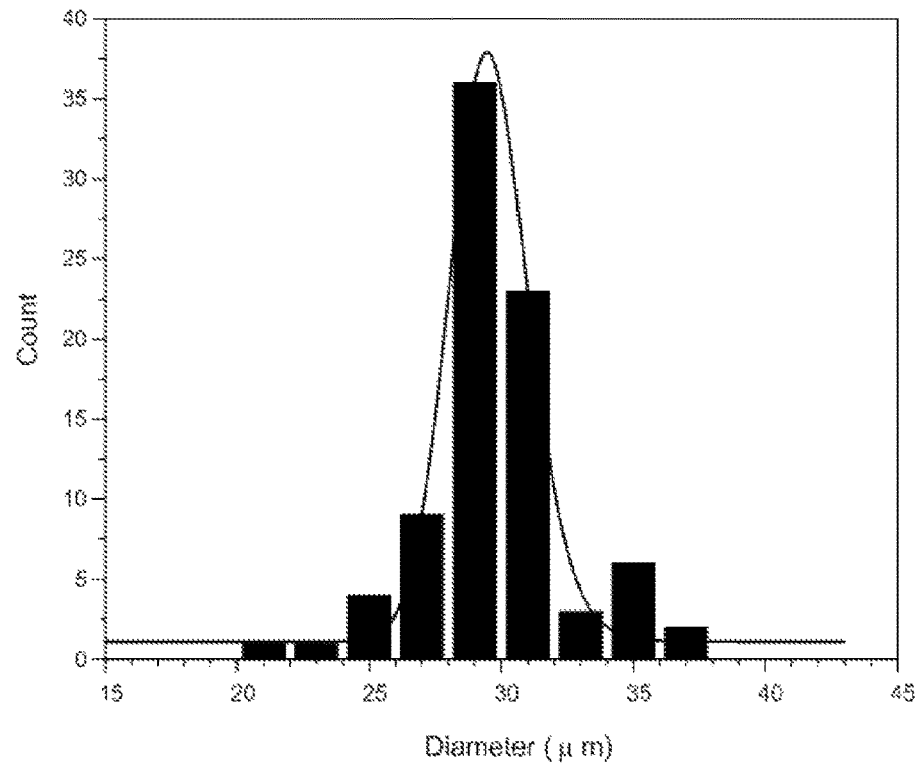
FIG. 2 is a graph of distribution of green fiber #172.
Figure 3:
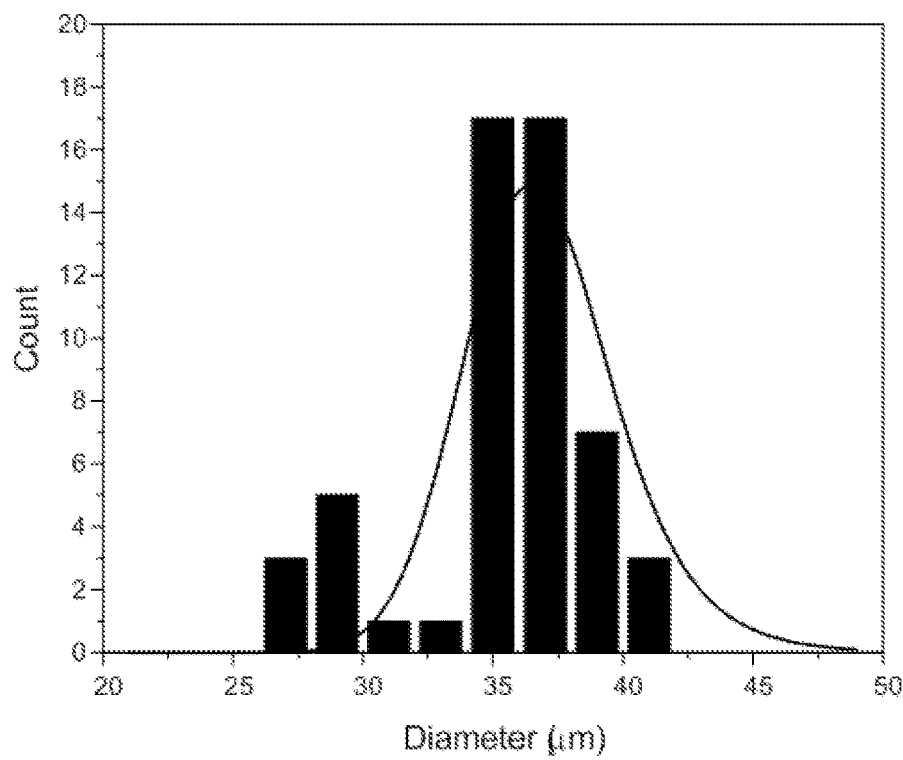
FIG. 3 is a graph of diameter distribution of green fiber T021.

Fibers diameters and distribution of the three sample lignin fibers #171, #172, and T021 were measured prior to stabilization and carbonization as shown in Tables 3-5 and FIGS. 1-3. The average diameter was about 31.1 μm for #171, about 29.8 μm for #172, and about 35.2 μm for T021, respectively. All three fiber samples had broad diameter variations. #172 had a relatively narrower diameter distribution than the other two fiber samples.

TABLE 3

Diameter of green fiber #171

| Filament # | Diameter (μm) |
|---|---|
| 1 | 29.08 |
| 2 | 33.05 |
| 3 | 33.69 |
| 4 | 33.00 |
| 5 | 33.21 |
| 6 | 27.41 |
| 7 | 28.21 |
| 8 | 33.78 |
| 9 | 38.22 |
| 10 | 19.03 |
| 11 | 20.08 |

TABLE 3-continued

Diameter of green fiber #171

| Filament # | Diameter (µm) |
|---|---|
| 12 | 30.24 |
| 13 | 31.73 |
| 14 | 30.79 |
| 15 | 30.03 |
| 16 | 40.83 |
| 17 | 40.54 |
| 18 | 28.00 |
| 19 | 29.81 |
| 20 | 39.73 |
| 21 | 38.72 |
| 22 | 33.88 |
| 23 | 37.37 |
| 24 | 28.22 |
| 25 | 33.91 |
| 26 | 35.23 |
| 27 | 33.35 |
| 28 | 31.13 |
| 29 | 28.44 |
| 30 | 28.10 |
| 31 | 33.91 |
| 32 | 31.50 |
| 33 | 44.00 |
| 34 | 27.58 |
| 35 | 32.83 |
| 36 | 33.88 |
| 37 | 35.14 |
| 38 | 33.20 |
| 39 | 38.02 |
| 40 | 31.92 |
| 41 | 27.96 |
| 42 | 35.67 |
| 43 | 33.45 |
| 44 | 38.16 |
| 45 | 28.89 |
| 46 | 29.34 |
| 47 | 36.41 |
| 48 | 30.47 |
| 49 | 27.42 |
| 50 | 37.69 |
| 51 | 35.71 |
| 52 | 29.30 |
| 53 | 24.68 |
| 54 | 23.55 |
| 55 | 37.95 |
| 56 | 34.09 |
| 57 | 22.92 |
| 58 | 21.78 |
| 59 | 30.32 |
| 60 | 28.94 |
| 61 | 28.83 |
| 62 | 29.10 |
| 63 | 29.66 |
| 64 | 26.92 |
| 65 | 26.87 |
| 66 | 30.20 |
| 67 | 31.92 |
| 68 | 27.25 |
| 69 | 26.35 |
| 70 | 32.40 |
| 71 | 38.19 |
| 72 | 28.56 |
| 73 | 20.36 |
| 74 | 31.84 |
| 75 | 23.94 |
| 76 | 31.06 |
| 77 | 27.87 |
| 78 | 32.12 |
| 79 | 25.04 |
| 80 | 29.56 |
| Minimum (µm) | 19.03 |
| Maximum (µm) | 44.00 |
| Average (µm) | 31.17 |
| St Dev | 4.96 |

TABLE 4

Diameter of green fiber #172

| Filament # | Diameter (µm) |
|---|---|
| 1 | 28.03 |
| 2 | 31.16 |
| 3 | 29.06 |
| 4 | 28.99 |
| 5 | 35.59 |
| 6 | 27.87 |
| 7 | 29.95 |
| 8 | 34.62 |
| 9 | 28.95 |
| 10 | 28.96 |
| 11 | 25.38 |
| 12 | 29.95 |
| 13 | 29.76 |
| 14 | 29.21 |
| 15 | 26.59 |
| 16 | 29.81 |
| 17 | 30.73 |
| 18 | 36.28 |
| 19 | 30.01 |
| 20 | 26.65 |
| 21 | 31.13 |
| 22 | 30.87 |
| 23 | 30.51 |
| 24 | 29.16 |
| 25 | 29.63 |
| 26 | 31.05 |
| 27 | 31.33 |
| 28 | 29.79 |
| 29 | 30.65 |
| 30 | 28.52 |
| 31 | 32.34 |
| 32 | 29.06 |
| 33 | 28.56 |
| 34 | 30.98 |
| 35 | 31.00 |
| 36 | 29.73 |
| 37 | 35.88 |
| 38 | 28.93 |
| 39 | 29.29 |
| 40 | 28.41 |
| 41 | 30.47 |
| 42 | 29.31 |
| 43 | 30.58 |
| 44 | 28.88 |
| 45 | 35.88 |
| 46 | 36.47 |
| 47 | 31.49 |
| 48 | 25.82 |
| 49 | 30.41 |
| 50 | 27.98 |
| 51 | 26.04 |
| 52 | 25.48 |
| 53 | 29.07 |
| 54 | 28.49 |
| 55 | 28.87 |
| 56 | 29.95 |
| 57 | 28.99 |
| 58 | 26.56 |
| 59 | 29.96 |
| 60 | 30.62 |
| 61 | 29.68 |
| 62 | 32.66 |
| 63 | 27.94 |
| 64 | 31.49 |
| 65 | 29.04 |
| 66 | 30.76 |
| 67 | 29.62 |
| 68 | 30.50 |
| 69 | 29.81 |
| 70 | 30.59 |
| 71 | 30.10 |
| 72 | 29.83 |
| 73 | 30.56 |
| 74 | 32.76 |
| 75 | 21.38 |

TABLE 4-continued

Diameter of green fiber #172

| Filament # | Diameter (μm) |
|---|---|
| 76 | 23.75 |
| 77 | 24.45 |
| 78 | 26.00 |
| 79 | 26.01 |
| 80 | 29.54 |
| 81 | 29.60 |
| 82 | 31.63 |
| 83 | 34.27 |
| 84 | 34.49 |
| 85 | 29.78 |
| Minimum (μm) | 21.38 |
| Maximum (μm) | 36.47 |
| Average (μm) | 29.79 |
| St Dev | 2.68 |

TABLE 5

Diameter of green fiber T021

| Filament # | Diameter (μm) |
|---|---|
| 1 | 33.99 |
| 2 | 36.94 |
| 3 | 37.16 |
| 4 | 39.08 |
| 5 | 34.68 |
| 6 | 28.30 |
| 7 | 29.04 |
| 8 | 28.73 |
| 9 | 27.05 |
| 10 | 27.93 |
| 11 | 39.05 |
| 12 | 34.28 |
| 13 | 39.64 |
| 14 | 37.85 |
| 15 | 36.65 |
| 16 | 38.04 |
| 17 | 37.06 |
| 18 | 37.06 |
| 19 | 36.94 |
| 20 | 34.48 |
| 21 | 30.04 |
| 22 | 37.13 |
| 23 | 36.24 |
| 24 | 28.38 |
| 25 | 38.11 |
| 26 | 35.93 |
| 27 | 36.41 |
| 28 | 35.23 |
| 29 | 34.04 |
| 30 | 36.49 |
| 31 | 38.30 |
| 32 | 40.53 |
| 33 | 40.12 |
| 34 | 40.25 |
| 35 | 35.15 |
| 36 | 37.98 |
| 37 | 34.96 |
| 38 | 34.34 |
| 39 | 37.41 |
| 40 | 34.15 |
| 41 | 35.06 |
| 42 | 27.75 |
| 43 | 36.10 |
| 44 | 35.06 |
| 45 | 35.67 |
| 46 | 37.85 |
| 47 | 36.23 |
| 48 | 36.88 |
| 49 | 38.83 |
| 50 | 28.64 |

TABLE 5-continued

Diameter of green fiber T021

| Filament # | Diameter (μm) |
|---|---|
| 51 | 34.80 |
| 52 | 34.06 |
| 53 | 34.46 |
| 54 | 34.15 |
| Minimum (μm) | 27.05 |
| Maximum (μm) | 40.53 |
| Average (μm) | 35.20 |
| St Dev | 3.51 |

Figure 4:
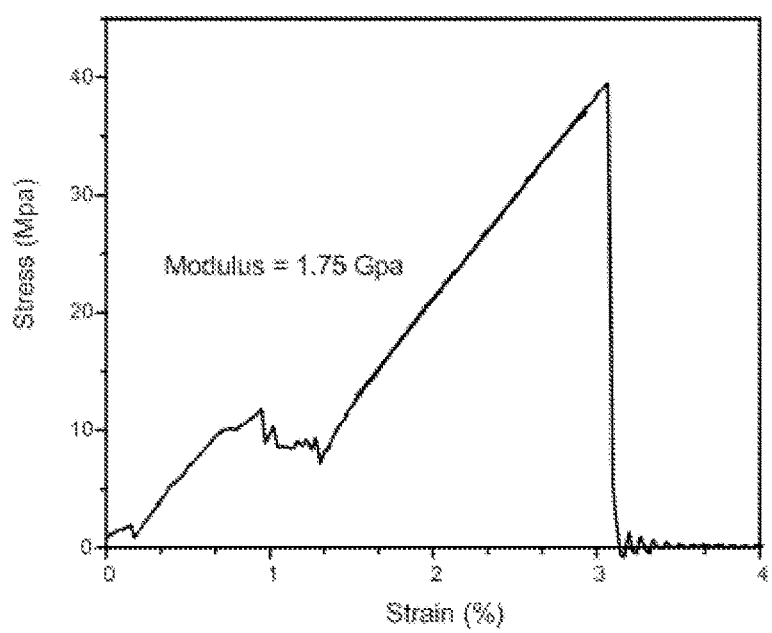
FIG. 4 is a typical stress-strain curve of green fiber #171.
Figure 5:
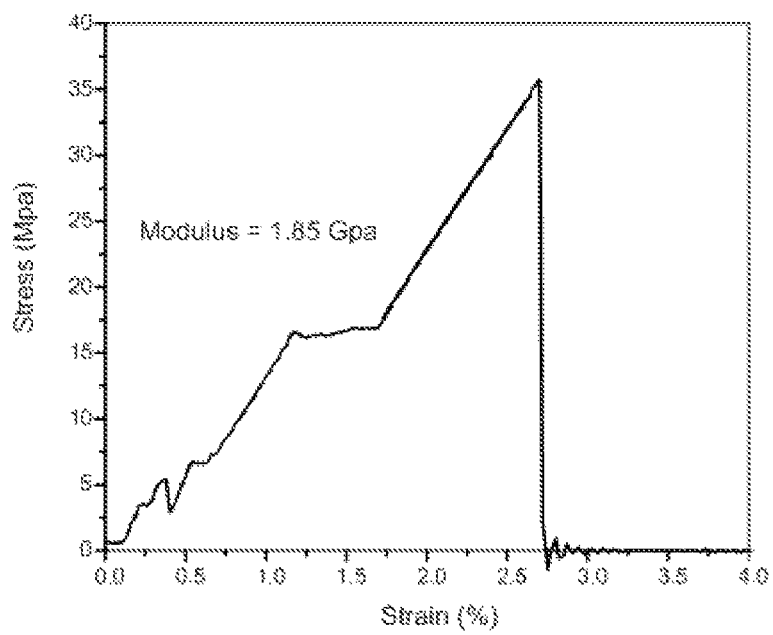
FIG. 5 is a typical stress-strain curve of green fiber #172.
Figure 6:
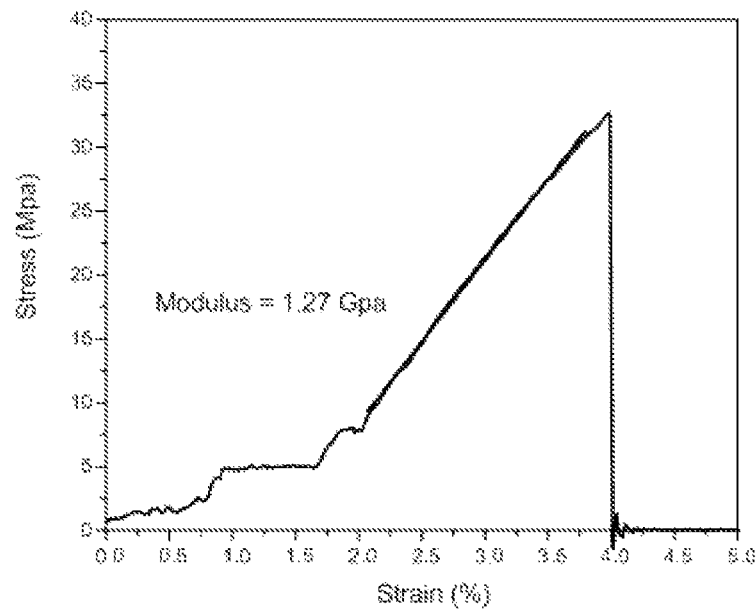
FIG. 6 is a typical stress-strain curve of green fiber T021.

The tensile strength of individual lignin fibers prior to stabilization and carbonization is listed in Tables 6-8. Their typical stress-strain curves are shown in FIGS. 4-6.

The tested lignin fibers had average tensile strengths of 30-33 MPa prior to any stabilization or carbonization processing.

TABLE 6

Tensile strength measurement of switchgrass lignin fiber # 171.

| Sample # | Mean Min. Diameter (μm) | Mean Max. Diameter (μm) | Mean Cross-Section (μm$^2$) | Break Extension (%)* | Break Strength (Mpa) |
|---|---|---|---|---|---|
| 1 | 34 | 34.1 | 912.7 | 3.76 | 29.18 |
| 2 | 22.9 | 23 | 412.6 | 4.97 | 43.51 |
| 3 | 21.7 | 21.8 | 372.7 | 3.54 | 48.17 |
| 4 | 30.3 | 30.3 | 722 | 0.99 | 12.91 |
| 5 | 28.9 | 29 | 657.7 | 3.53 | 34.98 |
| 6 | 28.8 | 28.9 | 652.7 | 2.57 | 8.87 |
| 7 | 29 | 29.1 | 664.9 | 2.29 | 24.27 |
| 8 | 29.6 | 29.7 | 690.9 | 3.29 | 42.39 |
| 9 | 26.9 | 27 | 569.2 | 3.54 | 39.64 |
| 10 | 26.8 | 26.9 | 566.9 | 4.15 | 41.96 |
| 11 | 30.1 | 30.2 | 716.1 | 3.09 | 39.52 |
| 12 | 31.9 | 32 | 800.3 | 8.9 | 27.03 |
| 13 | 27.2 | 27.3 | 583.1 | 4.7 | 47.11 |
| 14 | 23.9 | 24 | 450.1 | 1.81 | 30.62 |
| 15 | 31 | 31.1 | 757.8 | 2.54 | 20.2 |
| Max. | 21.7 | 21.8 | 372.7 | 0.99 | 8.87 |
| Min. | 34 | 34.1 | 912.7 | 8.9 | 48.17 |
| Average | 28.20 | 28.29 | 635.31 | 3.58 | 32.69 |
| StDev | 3.38 | 3.38 | 147.02 | 1.81 | 12.19 |

TABLE 7

Tensile strength measurement of poplar lignin fiber # 172.

| Sample # | Mean Min. Diameter (μm) | Mean Max. Diameter (μm) | Mean Cross-Section (μm$^2$) | Break Extension (%)* | Break Strength (Mpa) |
|---|---|---|---|---|---|
| 1 | 29.2 | 29.3 | 673.8 | 1.63 | 26.57 |
| 2 | 28.4 | 28.5 | 634.1 | 1.16 | 41.23 |
| 3 | 28.8 | 28.9 | 654.9 | 1.33 | 37.75 |
| 4 | 36.4 | 36.5 | 1044.6 | 1.08 | 33.2 |
| 5 | 31.4 | 31.5 | 778.9 | 1.34 | 34.58 |
| 6 | 27.9 | 28 | 614.9 | 1.48 | 24.97 |
| 7 | 25.4 | 25.5 | 509.7 | 1.79 | 44.84 |
| 8 | 29.9 | 30 | 704.5 | 1.26 | 27.57 |
| 9 | 30.6 | 30.7 | 736.4 | 3.07 | 25.78 |
| 10 | 29.6 | 29.7 | 692 | 3.34 | 35.8 |
| 11 | 32.6 | 32.7 | 837.9 | 2.93 | 28.1 |
| 12 | 31.4 | 31.5 | 778.7 | 2.98 | 43.21 |
| 13 | 29 | 29.1 | 662.3 | 2.72 | 37.63 |
| 14 | 30.7 | 30.8 | 743 | 3.14 | 44.36 |
| 15 | 29.6 | 29.7 | 688.9 | 3.27 | 39.52 |
| 16 | 30.4 | 30.5 | 730.5 | 2.48 | 40.22 |
| 17 | 29.8 | 29.8 | 697.7 | 2.48 | 34.59 |
| 18 | 30.5 | 30.6 | 735 | 3.1 | 31.84 |

TABLE 7-continued

Tensile strength measurement of poplar lignin fiber # 172.

| Sample # | Mean Min. Diameter (μm) | Mean Max. Diameter (μm) | Mean Cross-Section (μm$^2$) | Break Extension (%)* | Break Strength (Mpa) |
|---|---|---|---|---|---|
| 19 | 30 | 30.1 | 711.4 | 3.21 | 26.68 |
| 20 | 29.8 | 29.9 | 698.8 | 2.7 | 35.8 |
| 21 | 32.7 | 32.8 | 842.8 | 2.86 | 27.65 |
| 22 | 21.3 | 21.4 | 359.1 | 1.04 | 32.65 |
| 23 | 24.4 | 24.5 | 469.7 | 1.12 | 21.72 |
| 24 | 31.6 | 31.7 | 785.6 | 0.68 | 15.36 |
| 25 | 34.4 | 34.5 | 934 | 0.66 | 8.98 |
| 26 | 29.7 | 29.8 | 696.4 | 1.82 | 32.33 |
| Min. | 21.3 | 21.4 | 359.1 | 0.66 | 8.98 |
| Max. | 36.4 | 36.5 | 1044.6 | 3.34 | 44.44 |
| Average | 29.83 | 29.92 | 708.29 | 2.10 | 32.04 |
| St Dev | 2.97 | 2.97 | 135.31 | 0.92 | 8.66 |

TABLE 8

Tensile strength measurement of poplar lignin fiber T021.

| Sample # | Mean Min. Diameter (μm) | Mean Max. Diameter (μm) | Mean Cross-Section (μm$^2$) | Break Extension (%)* | Break Strength (Mpa) |
|---|---|---|---|---|---|
| 1 | 35.9 | 36 | 1013.9 | 3.29 | 38.08 |
| 2 | 36.4 | 36.4 | 1041.2 | 1.64 | 10.22 |
| 3 | 35.2 | 35.3 | 974.9 | 5.07 | 12.03 |
| 4 | 34 | 34.1 | 910.2 | 4.63 | 11.32 |
| 5 | 36.4 | 36.5 | 1045.8 | 2.97 | 13.51 |
| 6 | 38.2 | 38.3 | 1152 | 3.08 | 37.6 |
| 7 | 40.5 | 40.6 | 1290.2 | 3.17 | 32.66 |
| 8 | 40.2 | 40.3 | 1272.6 | 5.08 | 17.15 |
| 9 | 35.1 | 35.2 | 970.5 | 3.69 | 46.2 |
| 10 | 37.9 | 38 | 1133.2 | 3.99 | 32.68 |
| 11 | 34.3 | 34.3 | 926 | 3.69 | 27.65 |
| 12 | 37.4 | 37.4 | 1098.9 | 3.09 | 30.76 |
| 13 | 34.1 | 34.2 | 916.2 | 5.7 | 43.9 |
| 14 | 35 | 35.1 | 965.6 | 9.35 | 36.98 |
| 15 | 27.7 | 27.8 | 604.6 | 3.2 | 30.91 |
| 16 | 36.1 | 36.1 | 1023.4 | 4.27 | 44.43 |
| 17 | 35 | 35.1 | 965.4 | 2.92 | 39.23 |
| 18 | 35.6 | 35.7 | 999.2 | 2.89 | 39.47 |
| 19 | 37.8 | 37.9 | 1125.2 | 2.8 | 34.44 |
| 20 | 36.2 | 36.3 | 1031 | 1.33 | 20.6 |
| 21 | 36.8 | 36.9 | 1068.4 | 4.1 | 39.62 |
| Min. | 27.7 | 27.8 | 604.6 | 1.33 | 10.22 |
| Max. | 40.5 | 40.6 | 1290.2 | 9.35 | 46.2 |
| Average | 35.99 | 36.07 | 1025.16 | 3.81 | 30.45 |
| St Dev | 2.60 | 2.60 | 141.86 | 1.66 | 11.68 |

Figure 7:
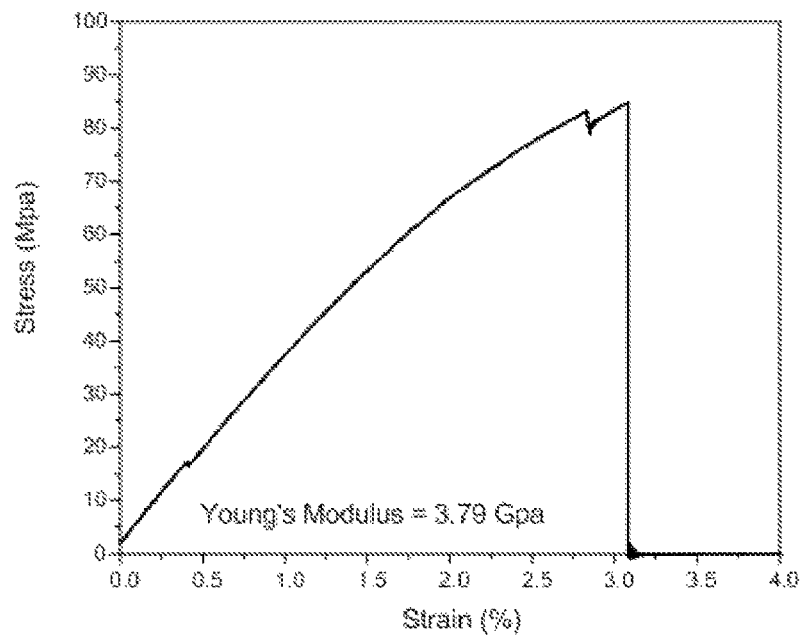
FIG. 7 is a typical Stress-Strain curve of HCl-stabilized switchgrass fiber #171.
Figure 8:
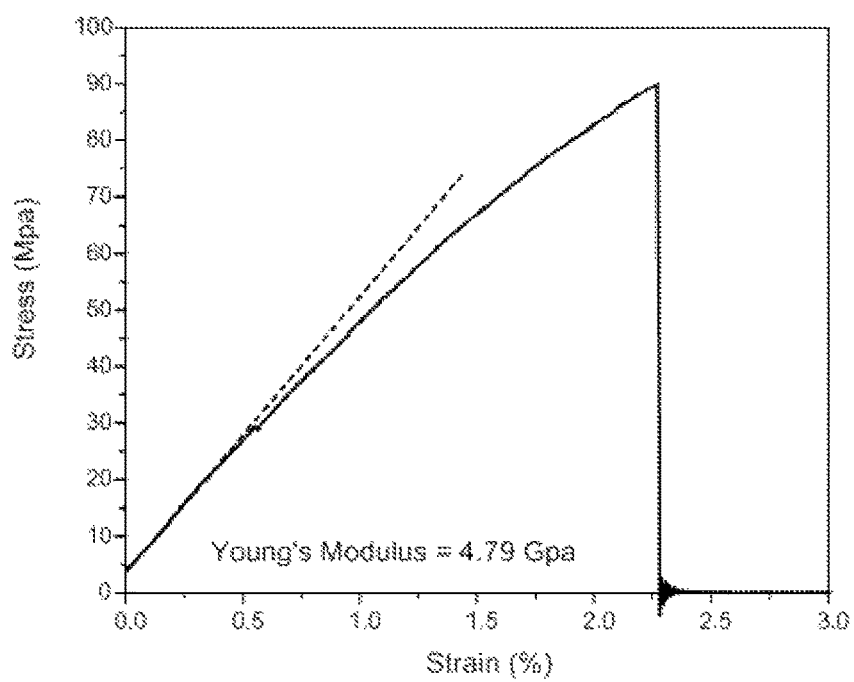
FIG. 8 is a typical Stress-Strain curve of HCl-stabilized poplar fiber #172.
Figure 9:
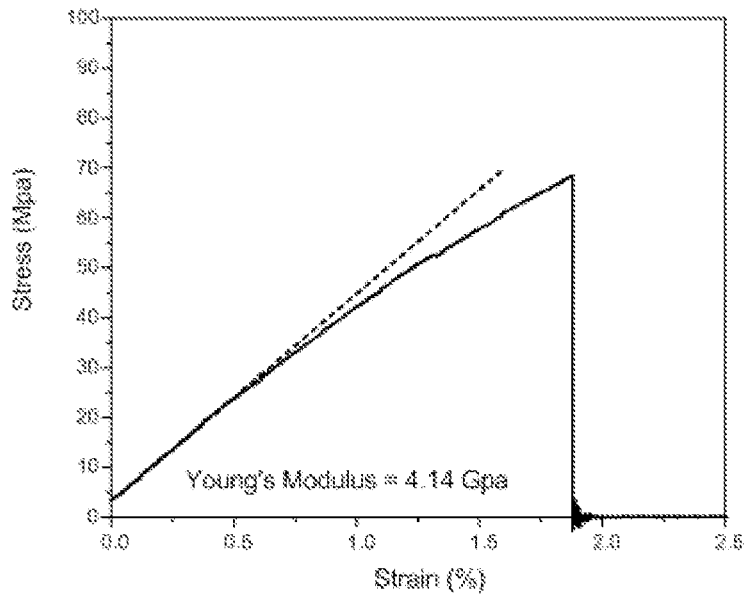
FIG. 9 is a typical Stress-Strain curve of HCl-stabilized poplar fiber T021.

The three sampled green fibers were stabilized with HCl in air as described above. The diameter and tensile strength of HCl-stabilized fibers are listed in Tables 9-11. Their typical stress-strain curves are shown in FIGS. 7-9.

After stabilizations with HCl and air, under a maximum temperature of 210° C., and during a shorter stabilization time (100-110 min), all three lignin (green) fibers were not fused and maintained their original fiber form. The HCl-stabilized fibers become stronger (54-82.7 MPa) than the green fibers (30-33 MPa).

Typical stress-strain curves also changed after stabilization. Stabilized lignin fibers become slightly tougher as compared with green fibers.

Also all fibers experienced a relatively large shrinkage along the fiber axis during stabilization. Fibers #171, #172, and T021 have shrinkages of about 16%, about 9%, and about 8%, respectively.

TABLE 9

Tensile strength and diameter of HCl-stabilized switchgrass fiber # 171.

| Sample # | Mean Min. Diameter (μm) | Mean Max. Diameter (μm) | Mean Cross-Section (μm$^2$) | Break Extension (%)* | Break Strength (Mpa) |
|---|---|---|---|---|---|
| 1 | 36.2 | 36.3 | 1031.7 | 1.37 | 52.73 |
| 2 | 35.3 | 35.4 | 983.4 | 2.12 | 69.88 |
| 3 | 37.9 | 37.9 | 1130.2 | 1.99 | 64.89 |
| 4 | 35.6 | 35.7 | 998.1 | 2.96 | 89.99 |
| 5 | 33.9 | 34 | 907.5 | 1.91 | 56.97 |
| 6 | 33 | 33 | 856.3 | 3.08 | 84.84 |
| 7 | 33.5 | 33.5 | 883.3 | 1.18 | 42.82 |
| 8 | 35.1 | 35.2 | 969.4 | 2.51 | 86.83 |
| 9 | 33 | 33 | 858.9 | 2.77 | 82.19 |
| 10 | 29.4 | 29.5 | 682.2 | 3.08 | 101.39 |
| 11 | 33.4 | 33.5 | 879.7 | 2.16 | 49.63 |
| 12 | 34.1 | 34.1 | 914.2 | 2.57 | 81.93 |
| 13 | 29.6 | 29.7 | 691.4 | 2.79 | 93.36 |
| Max. | 29.4 | 29.5 | 682.2 | 1.18 | 42.82 |
| Min. | 37.9 | 37.9 | 1130.2 | 3.08 | 101.39 |
| Average | 33.85 | 33.91 | 906.64 | 2.35 | 73.65 |
| St Dev | 2.39 | 2.38 | 124.72 | 0.62 | 18.71 |

TABLE 10

Tensile strength and diameter of HCl-stabilized poplar fiber # 172.

| Sample # | Mean Min. Diameter (μm) | Mean Max. Diameter (μm) | Mean Cross-Section (μm$^2$) | Break Extension (%)* | Break Strength (Mpa) |
|---|---|---|---|---|---|
| 1 | 25.7 | 25.8 | 522.1 | 2.99 | 93.01 |
| 2 | 26.8 | 26.9 | 565.2 | 0.94 | 39.14 |
| 3 | 26.1 | 26.2 | 537.5 | 2.06 | 76.75 |
| 4 | 28.2 | 28.2 | 624.2 | 2.2 | 79.52 |
| 5 | 27.2 | 27.3 | 583.9 | 2.75 | 92.92 |
| 6 | 27.7 | 27.8 | 603.4 | 2.72 | 83.98 |
| 7 | 27.1 | 27.1 | 576.7 | 2.61 | 89.31 |
| 8 | 24.8 | 24.9 | 486.7 | 2.27 | 90.01 |
| 9 | 26.1 | 26.2 | 536.7 | 2.77 | 89.75 |
| 10 | 26 | 26.1 | 531.7 | 2.46 | 83.87 |
| 11 | 25.2 | 25.3 | 501.9 | 1.91 | 70.77 |
| 12 | 25.7 | 25.8 | 522 | 2.72 | 97.73 |
| 13 | 24.6 | 24.7 | 475.9 | 2.19 | 87.81 |
| Max. | 24.6 | 24.7 | 475.9 | 0.94 | 39.14 |
| Min. | 28.2 | 28.2 | 624.2 | 2.99 | 97.73 |
| Average | 26.25 | 26.33 | 543.68 | 2.35 | 82.66 |
| StDev | 1.10 | 1.08 | 44.70 | 0.53 | 14.99 |

TABLE 11

Tensile strength and diameter of HCl-stabilized poplar fiber T021.

| Sample # | Mean Min. Diameter (μm) | Mean Max. Diameter (μm) | Mean Cross-Section (μm$^2$) | Break Extension (%)* | Break Strength (Mpa) |
|---|---|---|---|---|---|
| 1 | 34.9 | 35 | 960.7 | 1.82 | 63.78 |
| 2 | 28.9 | 29 | 658.8 | 2.16 | 70.07 |
| 3 | 29.2 | 29.2 | 672.1 | 1.19 | 46.27 |
| 4 | 29.5 | 29.5 | 685.3 | 1.22 | 49.54 |
| 5 | 29.1 | 29.2 | 668.3 | 1.19 | 47.12 |
| 6 | 26.5 | 26.5 | 552 | 0.65 | 30.3 |
| 7 | 30.7 | 30.8 | 742.4 | 0.64 | 28.74 |
| 8 | 26.4 | 26.5 | 551.1 | 1.39 | 53.32 |
| 9 | 30 | 30 | 708.1 | 1.31 | 51.19 |
| 10 | 25.8 | 25.9 | 526.1 | 2.62 | 75.05 |
| 11 | 27.3 | 27.4 | 590.1 | 1.88 | 68.49 |
| 12 | 29.8 | 29.9 | 701.3 | 1.06 | 40.8 |
| 13 | 28 | 28.1 | 617.1 | 2.32 | 83.55 |
| 14 | 29.4 | 29.5 | 683 | 0.67 | 29.3 |
| 15 | 29.4 | 29.5 | 685.1 | 2.17 | 72.74 |
| Max. | 25.8 | 25.9 | 526.1 | 0.64 | 28.74 |

TABLE 11-continued

Tensile strength and diameter of HCl-stabilized poplar fiber T021.

| Sample # | Mean Min. Diameter (μm) | Mean Max. Diameter (μm) | Mean Cross-Section (μm$^2$) | Break Extension (%)* | Break Strength (Mpa) |
|---|---|---|---|---|---|
| Min. | 34.9 | 35 | 960.7 | 2.62 | 83.55 |
| Average | 28.99 | 29.07 | 666.77 | 1.49 | 54.02 |
| StDev | 2.19 | 2.19 | 103.76 | 0.64 | 17.63 |

Figure 10:
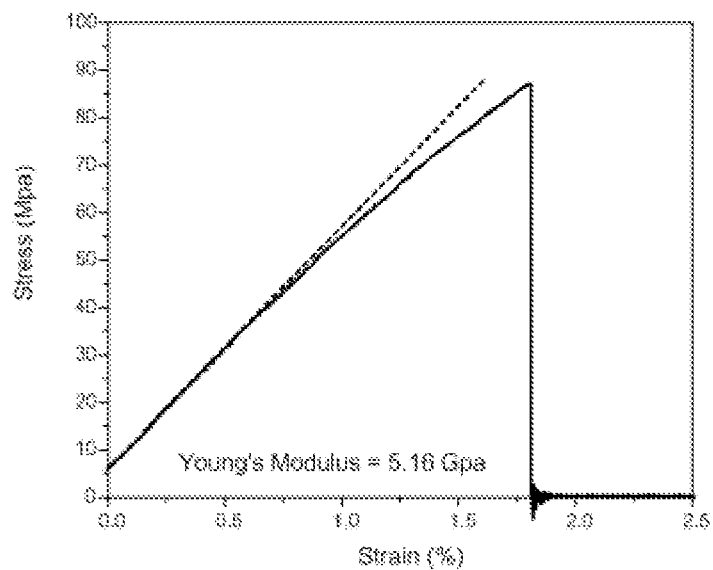
FIG. 10 is a typical Stress-Strain curve of conventionally stabilized fiber.

Diameter and tensile strength of stabilized fibers made according to a conventional stabilization process were also measured and are listed in Table 12. Typical stress-strain curve is shown in FIG. 10. Fibers stabilized by the conventional process exhibited mechanical properties similar to those of the HCl-stabilized lignin fibers #171 and #172.

TABLE 12

Tensile strength and diameter of conventionally stabilized fiber provided by CRC.

| Sample # | Mean Min. Diameter (μm) | Mean Max. Diameter (μm) | Mean Cross-Section (μm$^2$) | Break Extension (%)* | Break Strength (Mpa) |
|---|---|---|---|---|---|
| 1 | 20.5 | 20.6 | 332 | 1.97 | 87.01 |
| 2 | 20.2 | 20.3 | 321.5 | 1.8 | 87.27 |
| 3 | 19.2 | 19.3 | 289.9 | 0.95 | 50.26 |
| 4 | 20 | 20.1 | 317.1 | 1.98 | 86.01 |
| 5 | 20.2 | 20.2 | 320.5 | 1.86 | 82.19 |
| 6 | 19.5 | 19.6 | 300.7 | 2.02 | 83.2 |
| 7 | 18.5 | 18.6 | 270.7 | 0.36 | 25.19 |
| 8 | 18.5 | 18.6 | 271.1 | 1.47 | 71.46 |
| 9 | 19 | 19.1 | 285.1 | 1.62 | 77.95 |
| 10 | 19.1 | 19.2 | 287.1 | 0.49 | 30.92 |
| 11 | 19.1 | 19.2 | 287.1 | 2.26 | 97.58 |
| Max. | 18.5 | 18.6 | 270.7 | 0.36 | 25.19 |
| Min. | 20.5 | 20.6 | 332 | 2.26 | 97.58 |
| Average | 19.44 | 19.53 | 298.44 | 1.53 | 70.82 |
| St Dev | 0.70 | 0.69 | 21.27 | 0.64 | 24.31 |

Poplar lignin fiber T021 was used to study the effect of the HCl stabilization process on the stabilization speed of the fibers which were stabilized compared to other lignin fibers. Tables 13 and 14 list diameter and tensile strength of HCl-stabilized fibers, which were stabilized in 35 and 75, minutes respectively.

TABLE 13

Tensile strength and diameter of HCl-stabilized T021 fiber with 35 min.

| Sample # | Mean Min. Diameter (μm) | Mean Max. Diameter (μm) | Mean Cross-Section (μm$^2$) | Break Strength (Mpa) |
|---|---|---|---|---|
| 1 | 41.2 | 41.3 | 1337.9 | 28.19 |
| 2 | 36.1 | 36.1 | 1023.4 | 49.82 |
| 3 | 33.8 | 33.8 | 899.1 | 60.16 |
| 4 | 38.4 | 38.5 | 1161 | 59.4 |
| 5 | 37 | 37 | 1075.2 | 52.43 |
| 6 | 38.1 | 38.2 | 1143.9 | 47.53 |
| 7 | 39.2 | 39.3 | 1211.8 | 46.7 |
| 8 | 39.2 | 39.2 | 1207.1 | 38.12 |
| 9 | 39.7 | 39.8 | 1239.2 | 59.96 |

TABLE 13-continued

Tensile strength and diameter of HCl-stabilized T021 fiber with 35 min.

| Sample # | Mean Min. Diameter (μm) | Mean Max. Diameter (μm) | Mean Cross-Section (μm$^2$) | Break Strength (Mpa) |
|---|---|---|---|---|
| 10 | 40.1 | 40.2 | 1267.6 | 57.5 |
| 11 | 41.1 | 41.2 | 1329.3 | 75.62 |
| Max. | 41.2 | 41.3 | 1337.9 | 75.62 |
| Min. | 33.8 | 33.8 | 899.1 | 28.19 |
| Average | 38.5 | 38.6 | 1172.3 | 52.3 |
| St Dev | 2.2 | 2.3 | 132.5 | 12.6 |

TABLE 14

Tensile strength and diameter of HCl-stabilized T021 fiber with 75 min.

| Sample # | Mean Min. Diameter (μm) | Mean Max. Diameter (μm) | Mean Cross-Section (μm$^2$) | Break Strength (Mpa) |
|---|---|---|---|---|
| 1 | 38.9 | 39 | 1190.1 | 28.19 |
| 2 | 38.6 | 38.6 | 1169.7 | 49.82 |
| 3 | 35.9 | 36 | 1015.9 | 60.16 |
| 4 | 36.3 | 36.4 | 1037.2 | 59.4 |
| 5 | 37.6 | 37.7 | 1114.4 | 52.43 |
| 6 | 39.2 | 39.3 | 1212.7 | 47.53 |
| 7 | 38 | 38.1 | 1136.5 | 46.7 |
| 8 | 37.8 | 37.8 | 1122 | 38.12 |
| 9 | 35.1 | 35.2 | 969.5 | 59.96 |
| 10 | 36.3 | 36.4 | 1039.9 | 57.5 |
| 11 | 32 | 32.1 | 807.6 | 75.62 |
| 12 | 33.6 | 33.7 | 890.4 | 64.18 |
| 13 | 39.8 | 39.8 | 1244.2 | 48.34 |
| Max. | 39.8 | 39.8 | 1244.2 | 75.62 |
| Min. | 32 | 32.1 | 807.6 | 28.19 |
| Average | 36.9 | 36.9 | 1073.1 | 52.9 |
| St Dev | 2.3 | 2.3 | 129.2 | 12.0 |

Table 15 lists the effect of stabilization speed on the fiber length shrinkage, diameter and strength. As stabilization time reduces from 100 minutes to 35 minutes which means stabilization becomes faster, the T021 fibers displayed a larger longitudinal shrinkage; the fibers diameter increased, and even become larger than its original fiber diameter (35.2 μm). However, the fibers strengths showed no obvious major change.

TABLE 15

Shrinkage of HCl-stabilized T021 fibers

| | Stabilization speed | | |
|---|---|---|---|
| Stabilization time (min) | 100 | 75 | 35 |
| Length shrinkage (%) | ~8 | ~9.2 | ~11 |
| Fiber diameter (μm) | 29.0 | 36.9 | 38.5 |
| Fiber strength (MPa) | 54.30 | 52.9 | 52.3 |

*Spun T021 fiber has a diameter of 35.2 μm and strength of 30.5 MPa.

Three HCl-stabilized fibers were carbonized at 1000° C. in $N_2$. Carbonized fibers diameter, tensile strength and modulus were measured and are listed in Tables 16-18.

Figure 11:
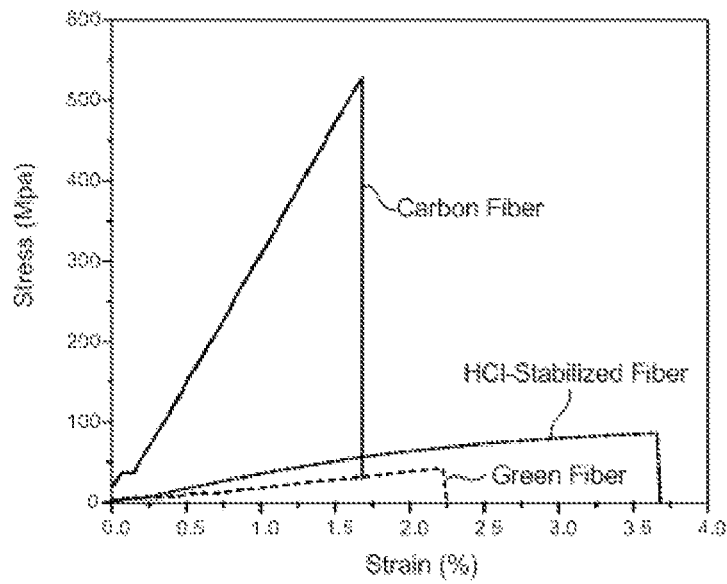
FIG. 11 is a typical stress-strain curves of green, HCl-stabilized and carbonized fibers.

Typical stress-strain curves in FIG. 11 illuminates the changes in fiber strength, modulus and break elongation from green fiber, HCl-stabilized fiber to carbonized fibers.

TABLE 16

Fiber diameter and tensile properties of switchgrass #171 lignin-based carbon fibers processed with HCl stabilization.

| Sample # | Mean Min. Diameter (μm) | Mean Max. Diameter (μm) | Mean Cross-Section (μm$^2$) | Break Extension (%) | Break Strength (MPa) | Corrected break extension (%) | Modulus (GPa) |
|---|---|---|---|---|---|---|---|
| 1 | 27.9 | 28 | 615.5 | 0.62 | 103.5 | 0.37 | 26.5 |
| 2 | 19 | 19.1 | 286.3 | 1.89 | 468.7 | 1.56 | 29.4 |
| 3 | 18.5 | 18.6 | 270 | 1.79 | 460.9 | 1.47 | 31.7 |
| 4 | 31.4 | 31.5 | 777.2 | 1.58 | 460.8 | 1.41 | 31.8 |
| 5 | 27.9 | 28 | 616.4 | 1.37 | 228.2 | 0.77 | 30.9 |
| 6 | 28.8 | 28.9 | 654.9 | 1.71 | 483.2 | 1.49 | 32.7 |
| 7 | 29.8 | 29.9 | 702.3 | 1.84 | 388.6 | 1.14 | 33.2 |
| 8 | 30.4 | 30.4 | 726 | 1.92 | 439.5 | 1.42 | 30.8 |
| 9 | 26.4 | 26.4 | 548.5 | 1.5 | 434.2 | 1.29 | 32.9 |
| 10 | 28 | 28.1 | 617.5 | 1.78 | 500.3 | 1.44 | 34.4 |
| 11 | 26.8 | 26.9 | 566.5 | 1.28 | 304.3 | 0.91 | 32.5 |
| 12 | 29.6 | 29.7 | 693.3 | 1.45 | 434.6 | 1.35 | 32.5 |
| 13 | 28.8 | 28.8 | 652.2 | 1.05 | 250.5 | 0.75 | 32.6 |
| 14 | 21.9 | 22 | 377.4 | 1.05 | 334.3 | 0.93 | 35.9 |
| 15 | 23.4 | 23.5 | 431.2 | 1.83 | 494.3 | 1.43 | 34.6 |
| 16 | 21.4 | 21.5 | 360.8 | 1.69 | 467.9 | 1.39 | 33.7 |
| 17 | 21.9 | 22 | 379.5 | 1.42 | 311.5 | 0.92 | 33.7 |
| 18 | 26.2 | 26.3 | 542.4 | 1.35 | 346.2 | 1.15 | 29.7 |
| 19 | 28.2 | 28.3 | 627.7 | 0.78 | 229.0 | 0.71 | 32.2 |
| 20 | 25.3 | 25.4 | 505.2 | 1.88 | 486.3 | 1.48 | 32.9 |
| 21 | 25.2 | 25.3 | 501.7 | 1.87 | 524.3 | 1.78 | 29.6 |
| 22 | 28.4 | 28.5 | 636.1 | 1.64 | 463.39 | 1.37 | 32.9 |
| 23 | 26.5 | 26.6 | 555 | 4.77 | 375.53 | 1.27 | 30.3 |
| 24 | 24.20 | 24.30 | 461.10 | 1.84 | 525.10 | 1.61 | 33.2 |
| 25 | 20.70 | 20.80 | 338.60 | 1.84 | 528.38 | 1.49 | 35.4 |
| 26 | 26.9 | 26.9 | 568.8 | 1 | 325.53 | 0.98 | 33.5 |
| Max. | 31.4 | 31.5 | 777.2 | 4.77 | 528.38 | 1.78 | 35.9 |
| Min. | 18.5 | 18.6 | 270 | 0.62 | 103.53 | 0.37 | 26.5 |
| Average | 25.9 | 26.0 | 538.9 | 1.64 | 398.8 | 1.23 | 32.3 |
| ST Dev | 3.5 | 3.5 | 139.4 | 0.74 | 110.5 | 0.34 | 2.1 |

TABLE 17

Fiber diameter and tensile properties of the poplar #172 lignin-based carbon fibers processed with HCl stabilization

| Sample # | Mean Min. Diameter (μm) | Mean Max. Diameter (μm) | Mean Cross-Section (μm$^2$) | Break Extension (%) | Break Strength (MPa) | Corrected break extension (%) | Modulus (GPa) |
|---|---|---|---|---|---|---|---|
| 1 | 21.7 | 21.8 | 372.5 | 1.67 | 545.3 | 1.55 | 35.2 |
| 2 | 21.2 | 21.2 | 353.4 | 1.54 | 498.5 | 1.47 | 34 |
| 3 | 22.5 | 22.6 | 398.4 | 1.73 | 509.6 | 1.49 | 34.1 |
| 4 | 22.6 | 22.7 | 404.4 | 1.39 | 418.1 | 1.2 | 35.4 |
| 5 | 23.9 | 24 | 449.5 | 1.64 | 496.1 | 1.48 | 33.9 |
| 6 | 22.5 | 22.6 | 398.6 | 1.49 | 468.5 | 1.43 | 33.1 |
| 7 | 23 | 23 | 415.8 | 1.56 | 512.5 | 1.54 | 33.1 |
| 8 | 21.7 | 21.8 | 373.1 | 1.67 | 519.8 | 1.47 | 34.8 |
| 9 | 23.3 | 23.4 | 427.3 | 1.61 | 481.7 | 1.41 | 34.7 |
| 10 | 22 | 22.1 | 382.1 | 1.72 | 578.9 | 1.64 | 35.2 |
| 11 | 23.2 | 23.3 | 425.8 | 1.49 | 396.8 | 1.15 | 34.5 |
| 12 | 20.7 | 20.8 | 339.4 | 1.56 | 395.5 | 1.23 | 32.6 |
| 13 | 20.8 | 20.8 | 339.8 | 2.41 | 626.1 | 1.77 | 35.1 |
| 14 | 22.7 | 22.7 | 404.8 | 1.78 | 441.8 | 1.28 | 34.5 |
| 15 | 23.3 | 23.4 | 428.9 | 1.6 | 507.7 | 1.47 | 33.6 |
| 16 | 20.5 | 20.6 | 331.7 | 1.73 | 576.5 | 1.73 | 34 |
| 17 | 23.5 | 23.5 | 433.5 | 4.55 | 557.9 | 1.77 | 32.7 |
| 18 | 22.5 | 22.6 | 400.4 | 1.68 | 577.8 | 1.6 | 36.7 |
| 19 | 23.6 | 23.7 | 442 | 2.43 | 590.3 | 1.78 | 31.6 |
| 20 | 21.8 | 21.9 | 376.5 | 1.27 | 423.0 | 1.17 | 36.1 |
| 21 | 21 | 21.1 | 347.6 | 1.68 | 479.3 | 1.43 | 33 |
| 22 | 21.1 | 21.2 | 351.3 | 1.77 | 494.8 | 1.46 | 34.6 |
| Max. | 23.9 | 24 | 449.5 | 4.55 | 626.1 | 1.78 | 36.7 |
| Min. | 20.5 | 20.6 | 331.7 | 1.27 | 395.48 | 1.15 | 31.6 |
| Average | 22.23 | 22.31 | 390.76 | 1.82 | 504.39 | 1.48 | 34.20 |
| ST Dev | 1.04 | 1.04 | 36.26 | 0.67 | 64.46 | 0.19 | 1.22 |

TABLE 18

Fiber diameter and tensile properties of poplar T021 lignin-based carbon fibers processed with HCl stabilization

| Sample # | Mean Min. Diameter (μm) | Mean Max. Diameter (μm) | Mean Cross-Section (μm²) | Break Extension (%) | Break Strength (MPa) | Corrected break extension (%) | Modulus (GPa) |
|---|---|---|---|---|---|---|---|
| 1 | 23.8 | 23.8 | 445.2 | 1.82 | 502.5 | 1.57 | 32.8 |
| 2 | 19.4 | 19.5 | 297.8 | 2.19 | 649.58 | 1.94 | 33.1 |
| 3 | 22.1 | 22.2 | 386 | 1.51 | 511.37 | 1.51 | 33.6 |
| 4 | 22.9 | 23 | 413 | 1.86 | 539.53 | 1.66 | 31.8 |
| 5 | 22 | 22.1 | 384.5 | 2.14 | 523.96 | 1.77 | 30 |
| 6 | 25.7 | 25.8 | 520.7 | 1.67 | 394.8 | 1.17 | 33 |
| 7 | 28.9 | 29 | 659.2 | 1.69 | 360.4 | 1.22 | 29.6 |
| 8 | 21.9 | 22 | 379.2 | 2.11 | 493.89 | 1.77 | 28 |
| 9 | 20.9 | 20.9 | 343.4 | 2.34 | 703.99 | 2.01 | 34.7 |
| 10 | 25.7 | 25.7 | 519.5 | 1.75 | 480.89 | 1.7 | 28.9 |
| 11 | 22.3 | 22.4 | 393.4 | 1.78 | 539.04 | 1.61 | 33.7 |
| 12 | 24.1 | 24.1 | 457.1 | 1.89 | 455.83 | 1.49 | 30.3 |
| 13 | 27.3 | 27.4 | 587.6 | 1.9 | 535.95 | 1.7 | 30.7 |
| 14 | 23.8 | 23.8 | 445.2 | 1.39 | 370.19 | 1.14 | 32.1 |
| 15 | 21.6 | 21.7 | 370.8 | 1.7 | 545.37 | 1.6 | 34.3 |
| 16 | 25.8 | 25.8 | 522.8 | 1.91 | 582.4 | 1.79 | 33 |
| 17 | 25.4 | 25.5 | 509.6 | 1.53 | 469.56 | 1.38 | 33.7 |
| 18 | 28.5 | 28.6 | 639.8 | 2.07 | 567.43 | 1.77 | 30.7 |
| 19 | 22.5 | 22.6 | 401 | 1.25 | 304.57 | 0.95 | 28.3 |
| 20 | 24.6 | 24.7 | 477.3 | 2.13 | 725.74 | 2.12 | 34.2 |
| 21 | 20.2 | 20.3 | 322.1 | 2.37 | 753.5 | 2.17 | 35.3 |
| 22 | 23.7 | 23.8 | 443.2 | 1.95 | 659.49 | 1.94 | 34 |
| Max. | 28.9 | 29 | 659.2 | 2.37 | 753.5 | 2.17 | 35.3 |
| Min. | 19.4 | 19.5 | 297.8 | 1.25 | 304.57 | 0.95 | 28 |
| Average | 23.8 | 23.9 | 450.9 | 1.86 | 530.5 | 1.64 | 32.1 |
| ST Dev | 2.5 | 2.5 | 96.6 | 0.29 | 117.8 | 0.32 | 2.2 |

Table 19 compares the data in tables 16-18 with previous data. It can be seen that the tensile property of carbon fiber processed by with HCl stabilization had generally similar values with those of the carbon fibers processed by a conventional stabilization process demonstrating that HCl stabilization (shorter thermal processing time) does not adversely affect the resulting carbon fiber properties.

TABLE 19

Comparison of carbon fiber properties

| Fiber property | # 171 Switchgrass Conventional | # 171 Switchgrass HCl Thermally Processed | #172 Poplar Conventional | #172 Poplar HCl Thermally Processed | T021 HCl Thermally Processed |
|---|---|---|---|---|---|
| Mean Diameter (μm) | 22.45 | 25.9 | 16.9 | 22.26 | 23.85 |
| Break Strength (MPa) | 377.7 | 398.8 | 514.7 | 504.4 | 530.5 |
| Break Extension (%) | 1.13 | 1.23 | 1.61 | 1.48 | 1.64 |
| Modulus (GPa) | 34.2 | 32.3 | 32.3 | 34.2 | 32.1 |

As a comparison carbonization was performed with fiber stabilized by a conventional stabilization process, which was also carbonized at 1000° C. in $N_2$. Fiber diameter and tensile properties were measured and are listed in Table 20. Although the source of original fiber was unknown, based on the fiber diameter and tensile properties, we believe that the stabilized fiber was poplar fiber #172.

TABLE 20

Fiber diameter and tensile properties of stabilized and carbonized lignin carbon fibers (without HCl stabilization).

| Sample # | Mean Min. Diameter (μm) | Mean Max. Diameter (μm) | Mean Cross-Section (μm²) | Break Extension (%) | Break Strength (MPa) | Corrected Break Extension (%) | Modulus (GPa) |
|---|---|---|---|---|---|---|---|
| 1 | 16.7 | 16.8 | 221.1 | 2.34 | 606.84 | 1.99 | 30.4 |
| 2 | 15.4 | 15.5 | 187.3 | 1.67 | 491.76 | 1.42 | 34.1 |
| 3 | 16 | 16.1 | 202.8 | 1.81 | 523.93 | 1.61 | 32.7 |

TABLE 20-continued

Fiber diameter and tensile properties of stabilized and carbonized lignin carbon fibers (without HCl stabilization).

| Sample # | Mean Min. Diameter (μm) | Mean Max. Diameter (μm) | Mean Cross-Section (μm$^2$) | Break Extension (%) | Break Strength (MPa) | Corrected Break Extension (%) | Modulus (GPa) |
|---|---|---|---|---|---|---|---|
| 4 | 14.5 | 14.6 | 172.5 | 1.49 | 487.44 | 1.29 | 36.1 |
| 5 | 14.7 | 14.8 | 171.6 | 1.44 | 431.48 | 1.3 | 33.3 |
| 6 | 13.7 | 13.9 | 149.7 | 2.19 | 646.92 | 1.81 | 35.6 |
| 7 | 17.5 | 17.6 | 242.4 | 1.8 | 527.54 | 1.63 | 32.6 |
| 8 | 16.1 | 16.2 | 206.1 | 1.59 | 506.3 | 1.51 | 33.4 |
| 9 | 17.9 | 18 | 253.2 | 1.61 | 394.77 | 1.23 | 31.9 |
| 10 | 17.8 | 17.9 | 251.5 | 1.53 | 414.77 | 1.33 | 31.1 |
| 11 | 18.8 | 18.9 | 278.4 | 1.6 | 385.48 | 1.2 | 32.1 |
| 12 | 15.8 | 15.9 | 198.3 | 1.79 | 545.32 | 1.61 | 33.7 |
| 13 | 14.7 | 14.8 | 171.9 | 1.59 | 433.82 | 1.26 | 34.9 |
| 14 | 15.4 | 15.5 | 186.6 | 1.3 | 403.97 | 1.25 | 32.7 |
| 15 | 16.2 | 16.3 | 208.4 | 2.53 | 574.89 | 1.9 | 30.4 |
| Max. | 18.8 | 18.9 | 278.4 | 2.53 | 646.92 | 1.99 | 36.1 |
| Min. | 13.7 | 13.9 | 149.7 | 1.3 | 385.48 | 1.2 | 30.4 |
| Average | 16.1 | 16.2 | 206.8 | 1.8 | 491.7 | 1.5 | 33.0 |
| St Dev | 1.4 | 1.4 | 36.4 | 0.3 | 80.6 | 0.3 | 1.7 |

In order to study the effect of stabilization speed on carbon fibers, T021 fibers were stabilized at different total times and were carbonized at the same temperature of 1000° C. in a nitrogen atmosphere. The fiber diameter and tensile properties are listed in Tables 21 and 22.

Table 23 shows that fibers have about 20% shrinkage during the carbonization process without any tension applied to the fibers. The diameter and tensile properties of resulting carbon fiber are affected by stabilization speed. As the stabilization time decreases from 100 to 35 minutes, carbon fiber diameter increases from 23.9 to 29.4 μm and tensile strength decreases from 531 to 477 MPa.

TABLE 21

Fiber diameter and tensile properties of T021 CF processed in 35 min of HCl stabilization

| Sample # | Mean Min. Diameter (μm) | Mean Max. Diameter (μm) | Mean Cross-Section (μm$^2$) | Break Extension (%) | Break Strength (MPa) | Corrected Break Extension (%) | Modulus (GPa) |
|---|---|---|---|---|---|---|---|
| 1 | 27.9 | 28 | 615.2 | 2.66 | 496.44 | 1.55 | 31.9 |
| 2 | 29.1 | 29.2 | 667 | 2.24 | 478.22 | 1.46 | 32.8 |
| 3 | 29.6 | 29.7 | 691.2 | 2.15 | 439.86 | 1.4 | 31.3 |
| 4 | 30.8 | 30.8 | 744.9 | 1.15 | 270.91 | 0.84 | 31.8 |
| 5 | 29.5 | 29.6 | 686.4 | 2.16 | 557.05 | 1.9 | 29.8 |
| 6 | 27.9 | 28 | 614.4 | 1.9 | 517.12 | 1.59 | 32.7 |
| 7 | 29 | 29.1 | 661.4 | 1.3 | 303.04 | 0.88 | 34.4 |
| 8 | 30.3 | 30.4 | 724.6 | 2.13 | 525.71 | 1.66 | 31.7 |
| 9 | 30.9 | 31 | 753.1 | 2 | 572.7 | 1.85 | 31.2 |
| 10 | 29.8 | 29.9 | 699.3 | 2.3 | 513.98 | 1.64 | 31.4 |
| 11 | 29.2 | 29.3 | 673.4 | 2.3 | 454.32 | 1.47 | 30.5 |
| 12 | 27.7 | 27.7 | 605.2 | 2 | 503.08 | 1.65 | 30.4 |
| 13 | 28.3 | 28.4 | 631.5 | 2.37 | 549.06 | 1.85 | 29.9 |
| 14 | 31.3 | 31.3 | 769.9 | 2.22 | 475.9 | 1.56 | 30.7 |
| 15 | 29.8 | 29.8 | 698.2 | 2.01 | 494.2 | 1.61 | 30.9 |
| Max. | 31.3 | 31.3 | 769.9 | 2.66 | 572.7 | 1.9 | 34.4 |
| Min. | 27.7 | 27.7 | 605.2 | 1.15 | 270.91 | 0.84 | 29.8 |
| Average | 29.4 | 29.5 | 682.4 | 2.1 | 476.8 | 1.5 | 31.4 |
| St Dev | 1.1 | 1.1 | 51.7 | 0.4 | 85.4 | 0.3 | 1.2 |

TABLE 22

Fiber diameter and tensile properties of T021 CF processed in 75 min of HCl stabilization

| Sample # | Mean Min. Diameter (μm) | Mean Max. Diameter (μm) | Mean Cross-Section (μm²) | Break Extension (%) | Break Strength (MPa) | Corrected Break Extension (%) | Modulus (GPa) |
|---|---|---|---|---|---|---|---|
| 1 | 26.5 | 26.6 | 554.1 | 2.19 | 516.18 | 1.59 | 32.8 |
| 2 | 22.3 | 22.4 | 395.2 | 1.97 | 444.63 | 1.36 | 33.5 |
| 3 | 23.2 | 23.3 | 425.8 | 2.3 | 524.3 | 1.72 | 30.6 |
| 4 | 24.1 | 24.2 | 459.4 | 1.9 | 452.56 | 1.42 | 32.1 |
| 5 | 23.8 | 23.8 | 446.7 | 2.05 | 480.37 | 1.87 | 25.8 |
| 6 | 25.7 | 25.7 | 521.9 | 1.87 | 504.7 | 1.66 | 30.2 |
| 7 | 24.6 | 24.7 | 477.5 | 2.12 | 478.39 | 1.71 | 27.7 |
| 8 | 23.4 | 23.5 | 431.7 | 1.69 | 460.86 | 1.44 | 31.9 |
| 9 | 28.1 | 28.2 | 624.2 | 2.06 | 505.01 | 1.63 | 31.1 |
| 10 | 23.6 | 23.6 | 437.8 | 1.84 | 421.09 | 1.36 | 30.6 |
| 11 | 23 | 23.1 | 417.1 | 1.97 | 452.97 | 1.5 | 29.9 |
| 12 | 23.2 | 23.2 | 423.3 | 2.58 | 699.82 | 2.14 | 32.4 |
| 13 | 24.9 | 25 | 489.6 | 2.15 | 543.3 | 1.72 | 31.4 |
| 14 | 25.5 | 25.6 | 518.7 | 1.65 | 370.32 | 1.37 | 27 |
| Max. | 28.1 | 28.2 | 624.2 | 2.58 | 699.82 | 2.14 | 33.5 |
| Min. | 22.3 | 22.4 | 395.2 | 1.65 | 370.32 | 1.36 | 25.8 |
| Average | 24.4 | 24.5 | 473.1 | 2.0 | 489.6 | 1.6 | 30.5 |
| St Dev | 1.6 | 1.6 | 63.2 | 0.2 | 75.5 | 0.2 | 2.3 |

TABLE 23

Effect of stabilization speed on carbon fiber property.

| | | Stabilization Speed | | |
|---|---|---|---|---|
| | Stabilization Time (min) | 100 | 75 | 35 |
| Carbon fiber property | Fiber shrinkage (%) | ~22 | ~19 | ~21 |
| | Diameter (μm) | 23.9 | 24.4 | 29.4 |
| | Strength (MPa) | 530.5 | 489.6 | 476.8 |
| | Modulus (GPa) | 32.1 | 30.5 | 31.4 |

Figure 12:
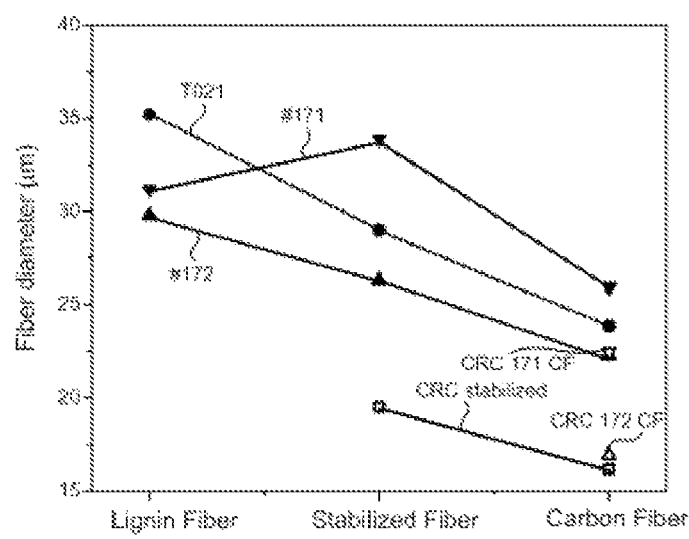
FIG. 12 is a graph of average fibers diameter as lignin is processed into carbon fibers.
Figure 13:
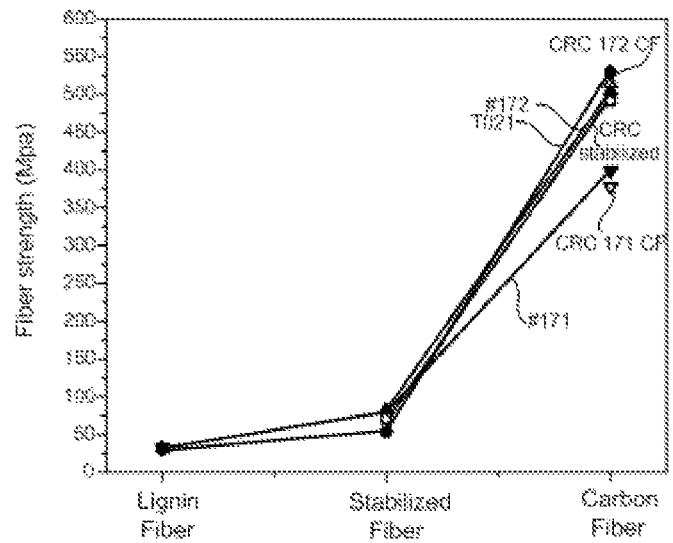
FIG. 13 is a graph of average fibers strength as lignin is processed into carbon fibers.

FIGS. 12 and 13 show the evolution of average diameter and tensile strength as the lignin fibers were thermally processed (stabilization with HCl in air for 100-110 min and carbonization in N₂) to convert the lignin fibers into carbon fibers.

For polar lignin fibers #172 and T021, fiber diameter decreases with stabilization and carbonization. However, switchgrass #171 shows an increase in fiber diameter after stabilization in HCl due to its highest shrinkage along fiber axis, suggesting that switchgrass lignin #171 has different HCl-stabilization behavior than that of the poplar lignin fibers #171 and T021. As expected, fiber strength increases with stabilization and carbonization processes for all lignin fibers.

Figure 14:
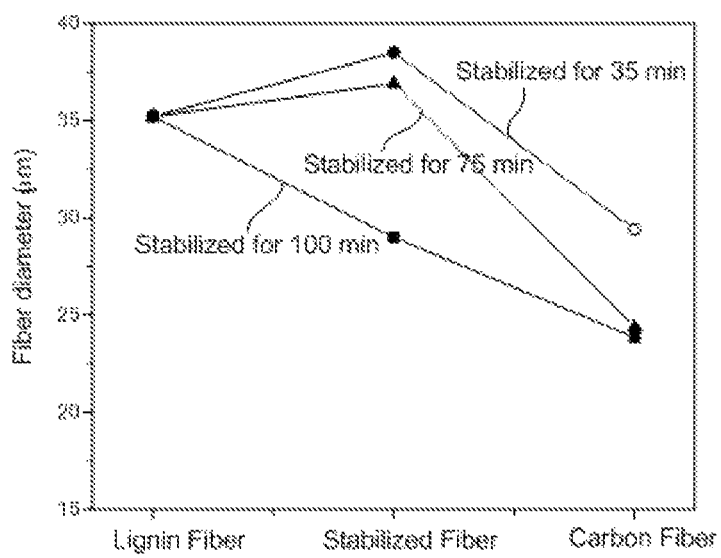
FIG. 14 is a graph of average fiber diameter as lignin T021 is processed into carbon fibers with different stabilization speeds.
Figure 15:
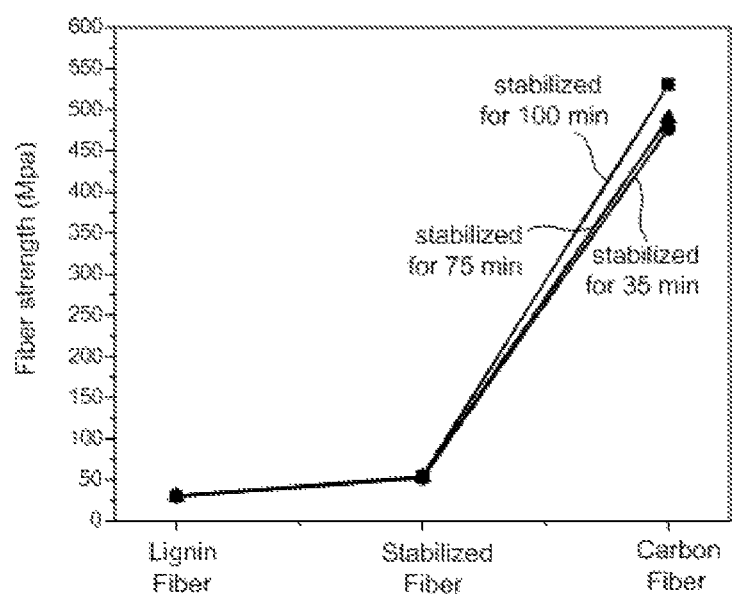
FIG. 15 is a graph of average fibers strength as lignin T021 is processed into carbon fibers with different stabilization speeds.

Evolution of average fiber diameter and tensile strength is shown in FIGS. 14 and 15 as lignin T021 is processed into carbon fibers with different stabilization speeds. It is obvious that stabilization speed affects carbon fiber diameter and tensile strength.

Table 24 lists carbon yields comparing conventional stabilization with HCl stabilization process. With HCl stabilization, the carbon fiber has 45.1% of carbon yield. In contrast, the fiber with conventional stabilization process has only 31.5% of carbon yield.

TABLE 24

Fiber yields after stabilization and carbonization, compared.

| Stabilization method | Stabilization yield (wt %) Stabilized fiber Green fiber | Carbonization yield (wt %) Carbonized fiber Stabilized fiber | Total Carbon Yield (wt %) Carbonized fiber Green fiber |
|---|---|---|---|
| Conventional process | 70.0 | 45.0 | 31.5 |
| HCl process | 88.4 | 51.0 | 45.1 |

As shown by the foregoing examples, fibers produced from lignin derived from biomass such as switchgrass and poplar may be effectively and more efficiently stabilized in air with HCl gas. The maximum stabilization temperature can be slightly lower at about 210° C. Stabilization time with HCl and air for most fibers was about 100-110 minutes. For the poplar lignin fiber (T021), stabilization speed was much faster. The shortest stabilization time tested was 35 minutes for the T021 fiber.

Despite shorter stabilization times, HCl-stabilized fibers exhibit mechanical properties similar to fibers stabilized by conventional processes, which require much longer time.

Stabilization speed (or time), affects fiber shrinkage, diameter and strength during the thermal process. Lignin fiber T021 showed about 10% shrinkages during the HCl-stabilization process depending on stabilization speed. The stabilized T021 fiber showed about 20% shrinkage during carbonization.

Tension may be applied to the fibers during the thermal processing including the stabilization and the carbonization processes to limit fiber shrinkage and to control fiber diameters.

As compared with conventional stabilization processing, HCl stabilization process may endow the resulting carbon fiber with higher carbon yield. A carbon yield increase of about 14% may reduce the cost of the resulting carbon fiber.

It is contemplated, and will be apparent to those skilled in the art from the preceding description that modifications and/or changes may be made in the embodiments of the disclosure. Accordingly, it is expressly intended that the foregoing description is illustrative of exemplary embodiments only, not limiting thereto, and that the true spirit and scope of the present disclosure be determined by reference to the appended claims.

What is claimed is:

1. A process for treating lignin fibers comprising:
heating lignin fibers, which become molten at about 180° to 200° C., to a temperature ranging from about 100° to about 220° C. while contacting the lignin fibers with an acidic gaseous atmosphere containing hydrochloric acid for a period of time sufficient to stabilize the lignin fibers by converting the lignin fibers to thermosetting lignin fibers.

2. The process of claim 1, wherein the hydrochloric acid is at a temperature ranging from about 20 to about 40° C.

3. The process of claim 1, wherein the lignin fibers are held in tension during the contacting step.

4. The process of claim 1, wherein the fibers are heated and contacted with the atmosphere for a period of time ranging from about 30 to about 150 minutes.

5. The process of claim 1, wherein the fibers are placed into a furnace preheated to about 100° C. and then heating the fiber from about 100° to about 220° C. in 1-3° C. per minute increments.

6. The process of claim 1, wherein the lignin fibers are derived from softwood, grass, switchgrass, poplar, or a mixture of softwood and grass thereof.

7. A process for treating lignin fibers comprising:
in a first step, heating lignin fibers, which become molten at about 180° to 200° C., to a temperature ranging from about 100° to about 220° C. while contacting the lignin fibers with an acidic gaseous atmosphere containing hydrochloric acid for a period of time sufficient to stabilize the lignin fibers by converting the lignin fibers to thermosetting lignin fibers, and
in a second step, carbonizing the stabilized lignin fibers by subjecting the stabilized lignin fiber to a temperature of at least about 1000° C. in a nitrogen atmosphere.

8. The process of claim 7, wherein the hydrochloric acid is at a temperature ranging from about 20 to about 40° C.

9. The process of claim 7, wherein the lignin fibers are held in tension during the contacting step.

10. The process of claim 7, wherein the fibers are heated and contacted with the atmosphere for a period of time ranging from about 30 to about 150 minutes.

11. The process of claim 7, wherein the fibers are placed into a furnace preheated to about 100° C. and then heating the fiber from about 100° to about 220° C. in 1-3° C. per minute increments.

12. The process of claim 7, wherein the lignin fibers are derived from softwood, grass, switchgrass, poplar, or a mixture of softwood and grass thereof.

* * * * *

UNITED STATES PATENT AND TRADEMARK OFFICE
CERTIFICATE OF CORRECTION

| | | |
|---|---|---|
| PATENT NO. | : 10,316,051 B2 | Page 1 of 1 |
| APPLICATION NO. | : 15/322780 | |
| DATED | : June 11, 2019 | |
| INVENTOR(S) | : Zhongren Yue et al. | |

It is certified that error appears in the above-identified patent and that said Letters Patent is hereby corrected as shown below:

In the Specification

Column 3, Line 15, change "FIG. 11 is a typical stress-strain curves of green, HCl-stabilized and carbonized fibers" to --FIG. 11 is a typical stress-strain curve of green, HCl-stabilized and carbonized fibers.--.

Column 15, Line 35, change "processed by with HCl stabilization" to --processed by HCl stabilization--.

In the Claims

Column 21, Lines 23-24, Claim 5, change "and then heating the fiber from about 100° to about 220°C" to --and then heating the fibers from about 100° to about 220°C--.

Column 22, Lines 9-10, Claim 7, change "in a second step, carbonizing the stabilized lignin fibers by subjecting the stabilized lignin fiber to a temperature of" to --in a second step, carbonizing the stabilized lignin fibers by subjecting the stabilized lignin fibers to a temperature of--.

Column 22, Lines 21-22, Claim 11, change "and then heating the fiber from about 100° to about 220°C" to --and then heating the fibers from about 100° to about 220°C--.

Signed and Sealed this
Twenty-ninth Day of October, 2019

Andrei Iancu
*Director of the United States Patent and Trademark Office*